United States Patent [19]

Nemoto et al.

[11] Patent Number: 5,123,512
[45] Date of Patent: Jun. 23, 1992

[54] AUTOMATIC WEAR ADJUSTMENT MULTIPLE-DISK CLUTCH APPARATUS

[75] Inventors: Keiji Nemoto; Kiyokazu Okubo, both of Utsunomiya; Shizuo Ishikura, Tochigi; Sunao Ishihara; Takahito Takekawa, both of Utsunomiya, all of Japan

[73] Assignee: Honda Giken Kogyo Kabushiki Kaisha, Tokyo, Japan

[21] Appl. No.: 680,476

[22] Filed: Apr. 4, 1991

[30] Foreign Application Priority Data

Apr. 11, 1990 [JP] Japan .............................. 2-38027[U]
Jul. 23, 1990 [JP] Japan .............................. 2-77396[U]

[51] Int. Cl.$^5$ ............................................. F16D 13/75
[52] U.S. Cl. ............................. 192/70.25; 192/111 A
[58] Field of Search ................... 192/70.25, 111 A; 188/71.8, 196 P

[56] References Cited

U.S. PATENT DOCUMENTS

| | | | |
|---|---|---|---|
| 2,057,802 | 10/1936 | Tatter | 192/111 A |
| 2,703,164 | 3/1955 | Binder | 192/111 A |
| 3,086,634 | 4/1963 | Reed | 192/111 A X |
| 3,797,622 | 3/1974 | Wörner et al. | 192/111 A |
| 3,938,636 | 2/1976 | Nerska | 192/111 A |
| 4,339,023 | 7/1982 | Maycock | 192/70.25 |
| 4,640,400 | 2/1987 | Nakane et al. | 192/70.25 |
| 4,684,002 | 8/1987 | Takeuchi | 192/70.25 |
| 4,742,901 | 5/1988 | Takeuchi et al. | 192/70.25 |
| 4,958,714 | 9/1990 | Cooke et al. | 192/111 A |

FOREIGN PATENT DOCUMENTS

| | | |
|---|---|---|
| 63-92827 | 6/1988 | Japan . |
| 1019169 | 2/1966 | United Kingdom . |
| 1365613 | 9/1974 | United Kingdom . |
| 2051261 | 1/1981 | United Kingdom . |

Primary Examiner—Richard Lorence
Attorney, Agent, or Firm—Armstrong, Nikaido, Marmelstein, Kubovcik & Murray

[57] ABSTRACT

A multiple-disk clutch apparatus including an input-side rotatable member having a clutch disk pressing surface, a pressure plate attached to the input-side rotatable member and disposed on an axially rear side opposing the pressing surface, a plurality of clutch disks disposed between the pressing surface and the pressure plate with an intermediate plate being interposed between the clutch disks, and a stopper member for restricting an axially rearward return position of the intermediate plate at the time of clutch disengagement. The stopper member is mounted on the input side rotatable member via a one-way mechanism which allows an axially forward movement of the stopper member but which restricts an axially rearward movement thereof. A holder for holding the one-way mechanism can be mounted on the input side rotatable member so as to be movable axially rearward against a spring. A restriction portion for restricting an axially forward movement of the holder can be formed in the input side rotatable member. A shock absorbing member can be interposed between the restriction portion and the holder.

7 Claims, 4 Drawing Sheets

AUTOMATIC WEAR ADJUSTMENT MULTIPLE-DISK CLUTCH APPARATUS

BACKGROUND OF THE INVENTION

This invention relates to a multiple-disk clutch particularly for use in a motor vehicle having a high-output engine mounted thereon.

A multiple-disk clutch is conventionally known as shown for example in Japanese Published Unexamined Utility Model Application No. 92827/1988. The multiple-disk clutch has a pressure plate disposed on an axially rear side opposing a clutch disk pressing surface which is formed on a flywheel. The pressure plate is attached to an input-side rotatable member constituted by the flywheel, a spacer and a clutch cover. A plurality of clutch disks are disposed between the pressing surface and the pressure plate with an intermediate plate being interposed between the clutch disks. A stopper surface is formed in the spacer. An axially rearward return position of the intermediate plate at the time of clutch disengagement is restricted by the abutting of an abutting plate against the stopper surface, the abutting plate being provided on an external periphery of the intermediate plate.

The abutting plate is dimensioned to be shorter than the distance between the stopper surface and the side surface of the flywheel opposing to the stopper surface by an amount equal to the disengaging allowance of the intermediate plate. The abutting plate is fastened, by a bolt via a coned disc spring, to the intermediate plate with the bolt being inserted into an axially elongated slot formed in the abutting plate enabling the abutting plate to be movable in an axial direction against the friction by the coned disc spring. In this arrangement, the mounting position of the abutting plate is adjusted at the time of clutch engagement so that the clearance dimension obtained by subtracting the thickness of the clutch disk on the front side of the intermediate plate from the distance between the intermediate plate and the pressure surface, i.e., the disengaging allowance of the intermediate plate, is always maintained constant in accordance with the wear of the front-side clutch disk.

When the number of revolutions of an engine is largely varied by racing or the like during clutch disengagement, the intermediate plate may sometimes be rotated accompanied by axial vibrations. At such time, the abutting plate of the above-described conventional disk clutch will strongly abut the stopper surface, and the abutting plate is caused to move forwards against the friction by the coned disc spring. Consequently, the return position of the intermediate plate is deviated backwards, and the intermediate plate will come into contact with the clutch disk on the side of the pressure plate, thereby giving rise to poor disengagement of the clutch.

OBJECT AND SUMMARY OF THE INVENTION

This invention has an object of providing a multiple disk clutch in which the intermediate plate can be securely maintained at a predetermined return position.

In order to attain the above-described object, this invention is a multiple-disk clutch apparatus comprising an input-side rotatable member having a clutch disk pressing surface; a pressure plate which is attached to the input side rotatable member and is disposed on an axially rear side opposing the pressing surface; a plurality of clutch disks disposed between the pressing surface and the pressure plate with an intermediate plate being interposed between the clutch disks; and a stopper member for restricting an axially, rearward return position of the intermediate plate at the time of clutch disengagement; wherein the stopper member is mounted on the input-side rotatable member via a one-way mechanism which allows an axially forward movement of the stopper member but which restricts an axially rearward movement thereof.

By the function of the one-way mechanism, the stopper member is supported so as not to move axially rearward relative to the input-side rotatable member. Therefore, even if the intermediate plate is subjected to rotation with axial vibrations during clutch disengagement, the intermediate plate is securely maintained at a predetermined return position by the stopper member.

When the clutch disk has worn, the stopper member is pushed axially forward via the intermediate plate by the urging force of the pressure plate at the time of clutch engagement. The stopper member moves forward relative to the input-side rotatable member until the movement of the intermediate plate is stopped when the clutch disk on the front side of the intermediate plate comes into close contact with the pressing surface. In this manner, the mounting position of the stopper member is so adjusted that the clearance dimension obtained by subtracting the thickness of the clutch disk on the front side from the distance between the intermediate plate and the pressing surface at the time of clutch disengagement, i.e., the disengaging allowance of the intermediate plate, is always maintained constant in accordance with the wear of the clutch disk.

In case the intermediate plate is subjected to rotation accompanied by axial vibrations during clutch disengagement, the deviation in position of the stopper member due to abutting of the intermediate plate may be prevented by the one-way mechanism as described above, but there is still a fear that wear may be generated by rattling between the stopper member and the intermediate plate. Therefore, according to another feature of this invention, a holder for holding the one-way mechanism is provided. The holder is mounted on the input-side rotatable member in such a manner that the holder is movable axially rearward against a spring. Therefore, the striking force of the intermediate plate is relieved by the spring. The above-described disadvantage is therefore eliminated.

In this arrangement, when the holder is returned axially forwards by the urging force of the spring, the holder strikes against the restriction portion formed in the input-side rotatable member which restricts the axially forward movement of the holder. The stopper member may be deviated axially forward due to the inertia force thereof. Consequently, there is a fear that poor clutch disengaging may happen due to lack of clutch disengaging allowance.

Therefore, according to still another feature of this invention, a shock absorbing member is interposed between the holder and the restricting portion. In this manner, the striking force of the holder against the restriction portion is relieved to prevent the forward deviation in position of the stopper member.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
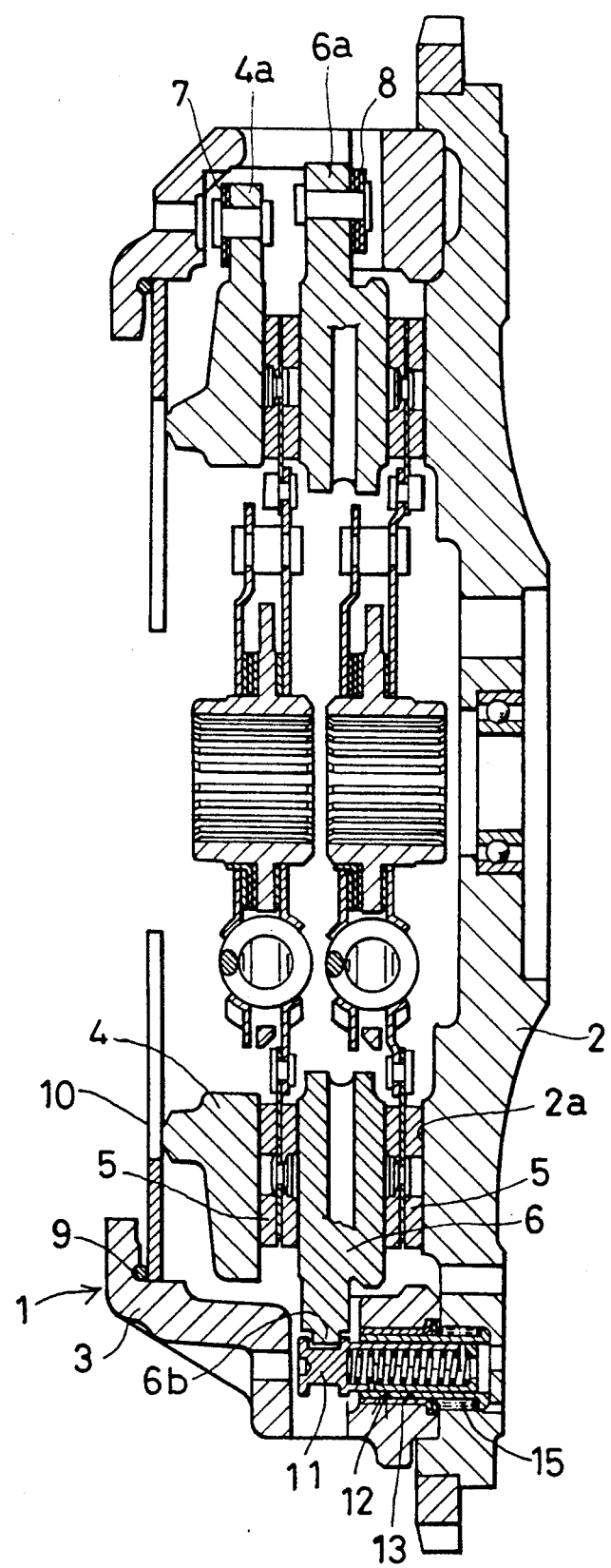
FIG. 1 is a sectional side view showing an embodiment of the multiple-disk clutch of this invention.

With reference to FIG. 1, an input side rotatable member 1 comprises a flywheel 2 and a clutch cover 3. A pressure plate 4 is provided on an axially rear side (left in the figure) of the, flywheel 2 opposing a clutch disc pressing surface 2a formed on the flywheel 2. Two clutch discs 5, 5 are disposed between the pressing surface 2a and the pressure plate 4 with an intermediate plate 6 interposed therebetween.

The multiple-disk clutch apparatus is constructed in the following manner. The pressure plate 4 is attached to the clutch cover 3 via each of the circumferentially extending straps 7 (in the figure only one is shown) which are riveted at one end thereof to four stays 4a projecting at an external circumference of the pressure plate 4. The intermediate plate 6 is similarly attached to the clutch cover 3 via circumferentially extending straps 8 which are riveted at one end thereof to stays 6a at an external periphery of the intermediate plate 6. A diaphragm-type clutch spring 10 is interposed between a pivot ring 9 which is mounted on the clutch cover 3 and the pressure plate 4 such that the clutch spring 10 pressingly contacts the pressure plate 4 on a diametrically inner side of the pivot ring 9. The clutch spring 10 is pulled axially rearward at its inner periphery by a release bearing which is not shown. The clutch spring 10 is then deformed into a cone shape and, as a result, the pressure plate 4 and the intermediate plate 6 move axially rearward by the resilient force of each strap 7, 8, thereby disengaging the clutch.

A stopper member 11 is also provided which restricts the axially rearward return position of the intermediate plate 6 at the time of clutch disengagement. The stopper member 11 is mounted on the input-side rotatable member 1 via a one-way mechanism 12 which allows the axial forward movement of, but restricts the axial rearward movement of, the stopper member 11.

Figure 2:
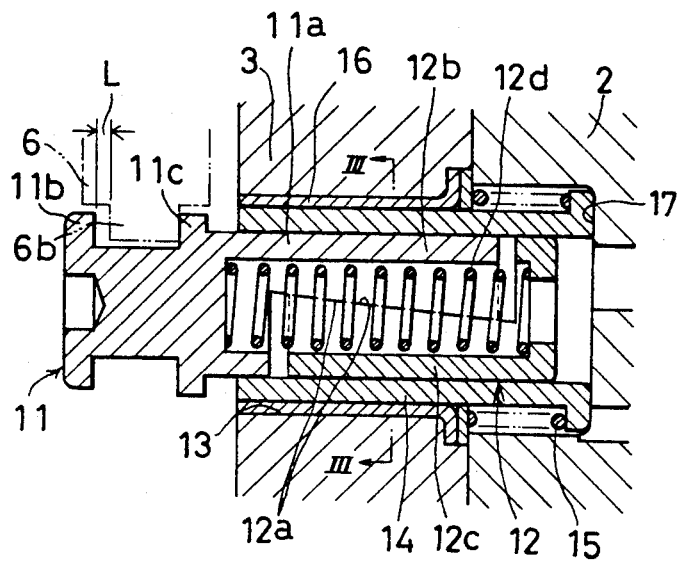
FIG. 2 is an enlarged sectional view of an important portion thereof.
Figure 3:
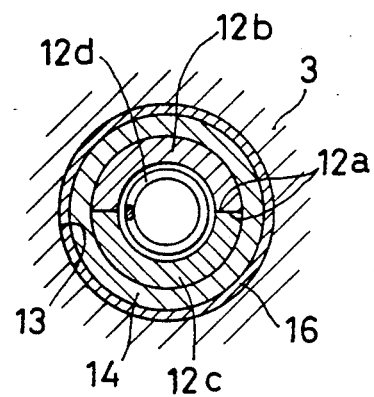
FIG. 3 is a sectional view taken along the line III—III of FIG. 2.

The stopper member 11 is supported, as shown in FIGS. 2 and 3, at its cylindrical supporting portion 11a in a mounting hole 13 which is provided in matching surfaces of the flywheel 2 and the clutch cover 3, so as to be slidable axially rearward and forward via a sleeve-like holder 14 which is positioned on the external periphery thereof. Flange-like stopper portions 11b, 11c are provided on the rear side of the supporting member 11a. The stopper portions 11b and 11c face an abutting portion 6b projecting on an external periphery of the intermediate plate 6. The supporting portion 11a is divided into two halves 12b, 12c which have axially inclined opposing wedge surfaces 12a. The one-way mechanism 12 is constituted by these halves 12b, 12c. A friction spring 12d is provided between the halves 12b, 12c so that an initial friction of the stopper member 11 relative to the holder 14 can be obtained.

The holder 14 is slidably inserted into a guide sleeve 16 which is mounted in the portion of the mounting hole 13 in the clutch cover 3. The portion of the mounting hole 13 in the flywheel 2 is formed with a larger diameter in order to contain therein a damper spring 15 which abuts a flange at the front end of the holder 14. The holder 14 is thus made to be movable axially rearward against the spring 15. The holder 14 is restricted in its axially forward movement by a restricting portion 17 constituted by an end surface of the mounting hole 13 in the flywheel 2.

The distance between the stoppers 11b, 11c shall be the width in the longitudinal (axial) direction of the abutting portion 6b of the intermediate plate 6 together with a disengaging allowance L for the intermediate plate 6. This disengaging allowance L is normally set to be 0.35 to 0.5 mm.

Next, the operation of the above-described embodiment is explained.

At the time of clutch disengagement, the clutch spring 10 loses its urging force and, consequently, the intermediate plate 6 is caused to move axially rearward due to the resilient force of the straps 8. As a result, the abutting portion 6b abuts the back-side stopper portion 11b of the stopper member 11. In this manner, the rearward returning position of the intermediate plate is restricted.

In this case, even if the abutting portion 6b strongly hits the stopper portion 11b through rotation accompanied by axial vibrations of the intermediate plate 6, the stopper member 11 is prevented from moving rearward relative to the holder 14 because the halves 12b, 12c are pressed against the internal circumference of the holder 14 due to the wedge function of the wedge surfaces 12a. Therefore, a deviation in position of the stopper member 11 does not happen. In addition, since the holder 14 is movable rearward against the damper spring 15, the striking force of the intermediate plate 6 is absorbed by the spring 15.

Further, when the front-side clutch disk 5 is worn, the abutting portion 6b of the intermediate plate 6 abuts the front-side stopper portion 11c due to the urging force of the clutch spring 10 at the time of clutch engagement. Consequently, the stopper member 11 is pushed axially forward. At this time, since the stopper member 11 is pushed in the direction of loosening relative to the wedge surfaces 12a, the stopper member 11 is moved forward relative to the holder 14 until the movement of the intermediate plate 6 is stopped when the front-side clutch disk 5 comes into close contact with the pressing surface 2a of the flywheel 2. The mounting position of the stopper member 11 is thus automatically adjusted, in accordance with the wear of the clutch disk 5, so that the disengaging allowance L of the intermediate plate 6 at the time of clutch disengagement becomes always constant irrespective of the wear of the clutch disk 5.

Figure 4:
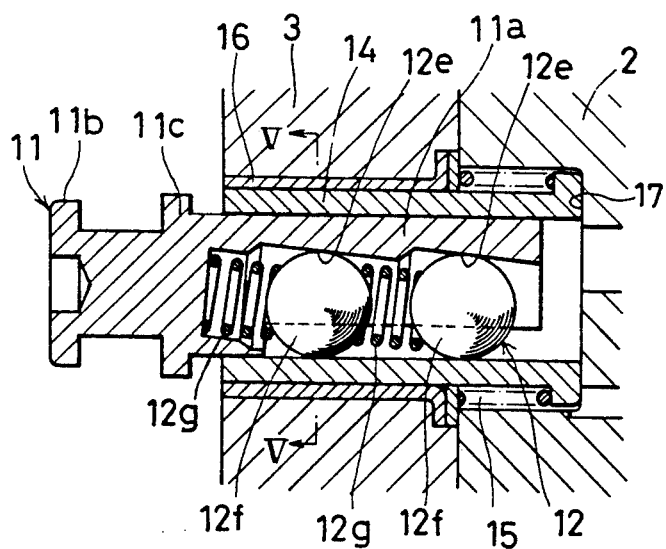
FIG. 4 is a sectional view of an important portion of a second embodiment of this invention.
Figure 5:
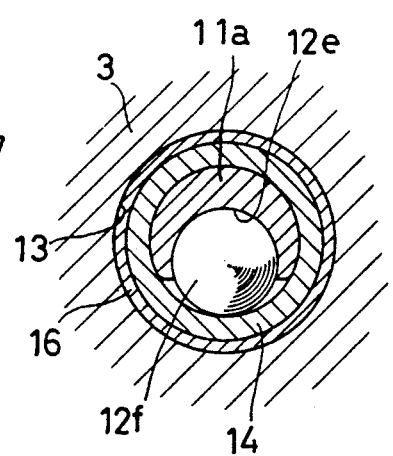
FIG. 5 is a sectional view taken along the line V—V thereof.

In the above-described embodiment, the one-way mechanism 12 is constituted by a pair of halves 12b, 12c having wedge surfaces 12a. This one-way mechanism 12 as shown in FIGS. 4 and 5 may however be constituted by: tapered surfaces 12e which are formed on an internal surface of the supporting portion 11a of the supporting member 11; balls 12f which are interposed between the tapered surfaces 12e and the internal surface of the holder 14; and friction springs 12g which urge the balls 12f in the forward direction. In addition, in this embodiment, the tapered surfaces 12e and the balls 12f are provided in the front and rear two stages in order to assure a larger amount of friction.

Figure 6:
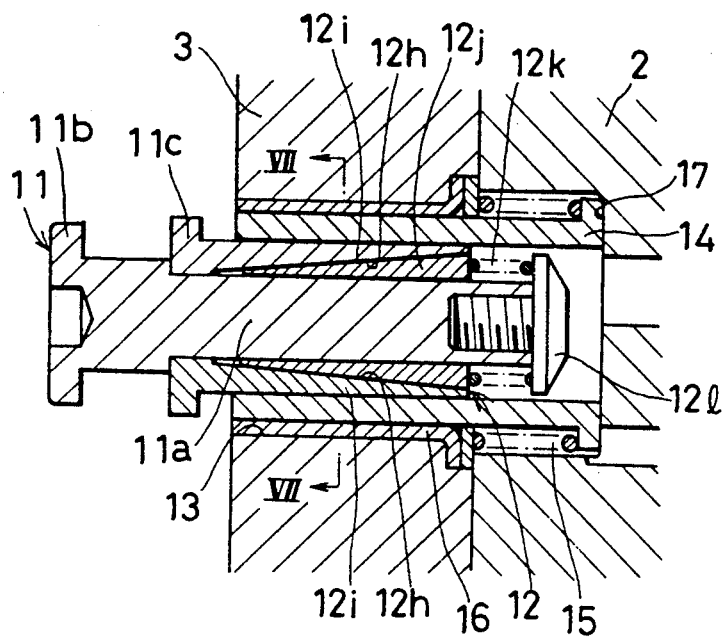
FIG. 6 is a sectional view of an important portion of a third embodiment of this invention.
Figure 7:
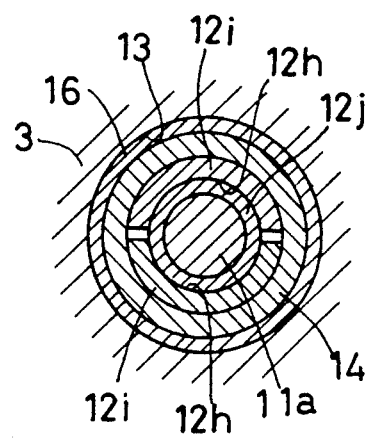
FIG. 7 is a sectional view taken along the line VII—VII thereof.

FIGS. 6 and 7 show still another embodiment. In this embodiment, two circumferentially half-divided pressing members 12i which have internal tapered surfaces 12h, and a cone-shaped wedge member 12j are provided between a rod-like supporting portion 11a and the holder 14. At the front end of the supporting member 12j, a friction spring 12k which urges the wedge member 12j rearward is positioned by a bolt 12. A one-way mechanism 12 is thus constituted by the pressing members 12i, the wedge member 12j and the spring 12k. The front-side stopper member 11c is formed by a flange portion at the rearward end of each of the pressing members 12i.

According to this arrangement, when an axially rearward force is applied to the stopper member 11, the wedge member 12j is pushed rearward via the friction spring 12k, and both pressing members 12i are caused, by a wedge function, to be closely adhered to the internal surface of the holder 14. As a result, a large amount of friction is generated between the holder 14 and the pressing members 12i, and the rearward movement of the stopper member 11 relative to the holder 14 is restricted. On the other hand, when an axially forward force is applied to the stopper member 11, only a relatively small amount of friction is generated by the friction spring 12k between the pressing members 12i and the holder 14. Therefore, when the urging force of the clutch spring 10 is applied, an axially forward movement of the stopper member 11 relative to the holder 14 is allowed.

Figure 8:
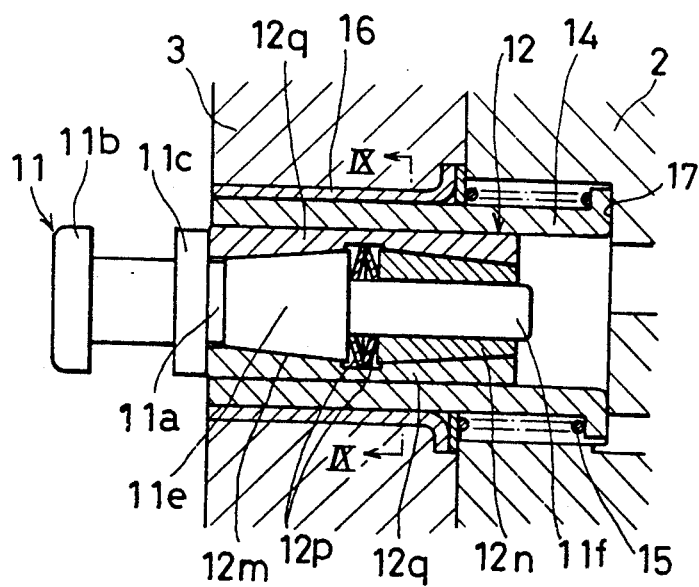
FIG. 8 is a sectional view of an important portion of a fourth embodiment of this invention.
Figure 9:
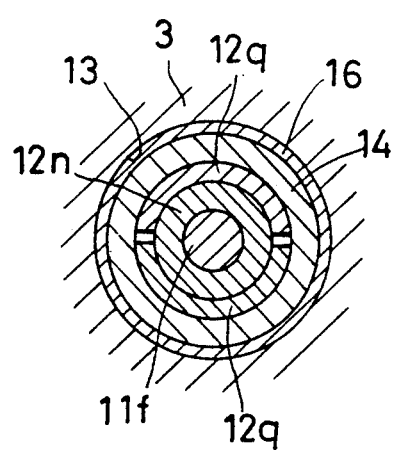
FIG. 9 is a sectional view taken along the line IX—IX thereof.

FIGS. 8 and 9 show still further embodiment. In this embodiment, the supporting portion 11a of the stopper member 11 is formed into a stepped form having a large-diameter portion 11e with an external tapered circumference and a small-diameter portion 11f which is positioned on the front side thereof. A wedge member 12n is provided on the external circumference of the small-diameter portion 11f so as to be urged axially forward by plate-like friction springs 12p. Two pressing members 12q are provided which have internal tapered surfaces. each conforming to the tapered surface 12m of the large-diameter portion and the tapered surface on the external circumference of the wedge member 12n, respectively. A one-way mechanism is thus constituted by the tapered surface 12m, the wedge member 12n, the pressing members 12q and the friction springs 12p.

According to this embodiment, when an axially rearward force is applied to the stopper member 11, the pressing members 12q are caused to be closely adhered to the internal surface of the holder 14 due to the wedge function of the tapered surface 12m of the large-diameter portion 11e, and a large amount of friction is generated between the pressing members 12q and the holder 14. Consequently, the ,backward movement of the stopper member 11 relative to the holder 14 is restricted. On the other hand, when an axially forward force is applied to the stopper member 11, only a relatively small amount of friction is generated between the pressing members 12q and the holder 14 due to the wedge function by the wedge member 12n and the internal tapered surfaces of the pressing members 12q by means of the friction springs 12p. Therefore, when the urging force of the clutch spring 10 is applied, the axially forward movement of the stopper member 11 relative to the holder 14 is allowed.

Figure 10:
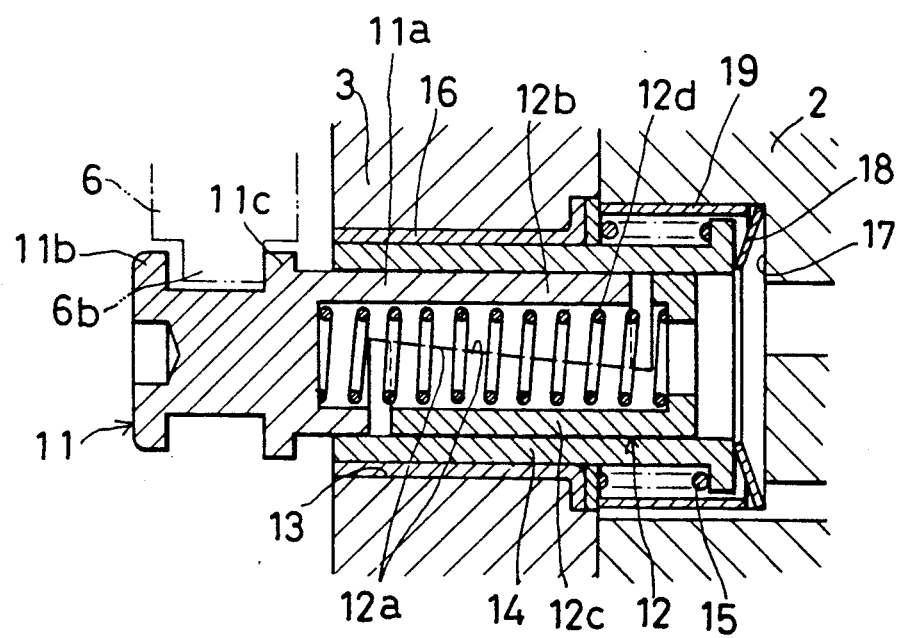
FIG. 10 is a sectional view of an important portion of a fifth embodiment of this invention.

In the embodiment shown in FIG. 10, a shock-absorbing member 18 comprising a coned disc spring is interposed between the holder 14 and the restriction portion 17 which restricts the axially forward movement of the holder 14. The shock-absorbing member 18 is prevented from being pulled out by a spring collar 19 which is resiliently fitted into the hole portion on the side of the flywheel 2 of the mounting hole 13. The shock-absorbing member 18 is thus so arranged that it is not dropped out of the flywheel 2 before assembling the holder 14. According to this embodiment, the striking force to be generated when the stopper member 11 is returned axially forward by the urging force of the damper spring 15, is absorbed by the coned disc spring 17. Therefore, the positional deviation of the stopper member 11 in the axially forward direction due to an inertial force thereof is not generated. The one-way mechanism 12 of the embodiment as shown in FIG. 10 is the same as that shown in FIG. 2.

In case the clutch disks 5 are provided in three pieces or more, one piece of intermediate plate 6 is interposed in every pitch formed by a pair of opposing clutch disks 5. These intermediate plates 6 are engaged with either a common stopper member 11 or separate ones 11, and the stopper member or members 11 are mounted on the input-side rotatable member 1 via the same one-way mechanism 12 as the above described one. It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A multiple-disk clutch apparatus comprising:
an input-side rotatable member having a clutch disk pressing surface;
a pressure plate attached to said input-side rotatable member and disposed on an axially rear side opposing said pressing surface;
a plurality of clutch disks disposed between said pressing surface and said pressure plate;
an intermediate plate interposed between said clutch disks;
a stopper member for restricting rearward movement of said intermediate plate as said clutch is disengaged;
said stopper member being mounted on said input-side rotatable member through a one-way means for allowing axially forward movement of said stopper member as said clutch is engaged while restricting axially rearward movement of said member as said clutch is disengaged; and
a holder for holding said one-way means, said holder being mounted on said input-side rotatable member and being movable axially rearward against a spring.

2. A multiple-disk clutch apparatus according to claim 1, wherein a restriction portion for restricting axially forward movement of said holder is formed in said input-side rotatable member, and a shock absorbing member is interposed between said restriction portion and said holder.

3. A multiple-disk clutch apparatus comprising:
an input-side rotatable member having a clutch disk pressing surface;
a pressure plate attached to said input-side rotatable member and disposed on an axially rear side opposing said pressing surface;
a plurality of clutch disks disposed between said pressing surface and said pressure plate;
an intermediate plate interposed between said clutch disks;
a stopper member for restricting rearward movement of said intermediate plate as said clutch is disengaged;
said stopper member being mounted on said input-side rotatable member through a one-way means for allowing axially forward movement of said stopper member as said clutch is engaged while restricting axially rearward movement of said stopper member as said clutch is disengaged;
said stopper member further comprising a cylindrical supporting portion divided into two halves having axially inclined opposing edge surfaces with a spring between said halves, said halves and said spring forming said one-way means; and a holder for holing said one-way means, said holder being mounted on said input-side rotatable member and being movable axially rearward against a spring.

4. A multiple-disk clutch apparatus according to claim 3, wherein a restriction portion for restricting axially forward movement of said holder is formed in said input-side rotatable member, and a shock absorbing member is interposed between said restriction portion and said holder.

5. A multiple-disk clutch apparatus comprising:
an input-side rotatable member having a clutch disk pressing surface;
a pressure plate attached to said input-side rotatable member and disposed on an axially rear side opposing said pressing surface;
an intermediate plate interposed between said clutch disk;
a stopper member for restricting rearward movement of said intermediate plate as said clutch is disengaged;
said stopper member being mounted on said input-side rotatable member through a one-way means for allowing axially forward movement of said stopper member as said clutch is engaged while restricting axially rearward movement of said stopper member as said clutch is disengaged a holder for holding said one-way means, said holder being mounted on said input-side rotatable member and being movable axially rearward against a spring;
said stopper member further comprising a substantially cylindrical supporting portion having tapered surfaces formed on an internal surface thereof with balls between said tapered surfaces and an internal surface of said holder and springs urging said balls in a forward direction, said balls, said tapered surfaces and said springs forming said one way means.

6. A multiple-disk clutch apparatus comprising:
an input-side rotatable member having a clutch disk pressing surface;
a pressure plate attached to said input-side rotatable member and disposed on an axially rear side opposing said pressing surface;
a plurality of clutch disks disposed between said pressing surface and said pressure plate;
an intermediate plate interposed between said clutch disks;
a stopper member for restricting rearward movement of said intermediate plate as said clutch is disengaged;
said stopper member being mounted on said input-side rotatable member through a one-way means for allowing axially forward movement of said stopper member as said clutch is engaged while restricting axially rearward movement of said stopper member as said clutch is disengaged;
said stopper member further comprising a rod-like supporting portion having a bolt on an end distal from said intermediate plate, circumferentially divided pressing members having internal tapered surfaces on said rod-like supporting portion, a cone-shaped wedge member between said rod-like supporting portion and said pressing members and a spring between said wedge member and said bolt, said spring urging said wedge member against said tapered surfaces of said pressing members and a holder for holding said one-way means, said holder being mounted on said input-side rotatable member and being movable axially rearward against a spring.

7. A multiple-disk clutch apparatus comprising:
an input-side rotatable member having a clutch disk pressing surface;
a pressure plate attached to said input-side rotatable member and disposed on an axially rear side opposing said pressing surface;
a plurality of clutch disks disposed between said pressing surface and said pressure plate;
an intermediate plate interposed between said clutch disk;
a stopper member for restricting rearward movement of said intermediate plate as said clutch is disengaged;
said stopper member being mounted on said input-side rotatable member through a one-way means for allowing axially forward movement of said stopper member as said clutch is engaged while restricting axially rearward movement of said stopper member as said clutch is disengaged;
said stopper member further comprising a stepped form supporting portion having a large-diameter portion with an external tapered circumference and a small-diameter cylindrical portion positioned on the front side of said large diameter portion, a wedge member on the external circumference of said small-diameter portion, plate-like springs urging said wedge member axially forwards, and two pressing members having internal tapered surfaces, conforming to said tapered surface of said large-diameter portion and said tapered surface on said external circumference of said wedge member, respectively; and a holder for holding said one-way means, said holder being mounted on said input-side rotatable member and being movable axially rearward against a spring.

* * * * *

UNITED STATES PATENT AND TRADEMARK OFFICE
CERTIFICATE OF CORRECTION

PATENT NO. : 5,123,512
DATED : June 23, 1992
INVENTOR(S) : Nemoto et al

It is certified that error appears in the above-indentified patent and that said Letters Patent is hereby corrected as shown below:

Column 6, claim 1, line 65, after "said" insert --stopper--.

Column 7, claim 3, line 32, "holing" should read --holding--.

Column 7, claim 5, line 46, after ";" insert the following paragraph:

--a plurality of clutch disks disposed between said pressing surface and said pressure plate;--.

Column 7, claim 5, line 47, "disk" should read --disks--.

Column 7, claim 5, line 57, after "disengaged" insert --;--.

Signed and Sealed this

Fourteenth Day of September, 1993

Attest:

BRUCE LEHMAN

*Attesting Officer*      *Commissioner of Patents and Trademarks*